Jan. 8, 1935.  T. H. WILLIAMS  1,987,566

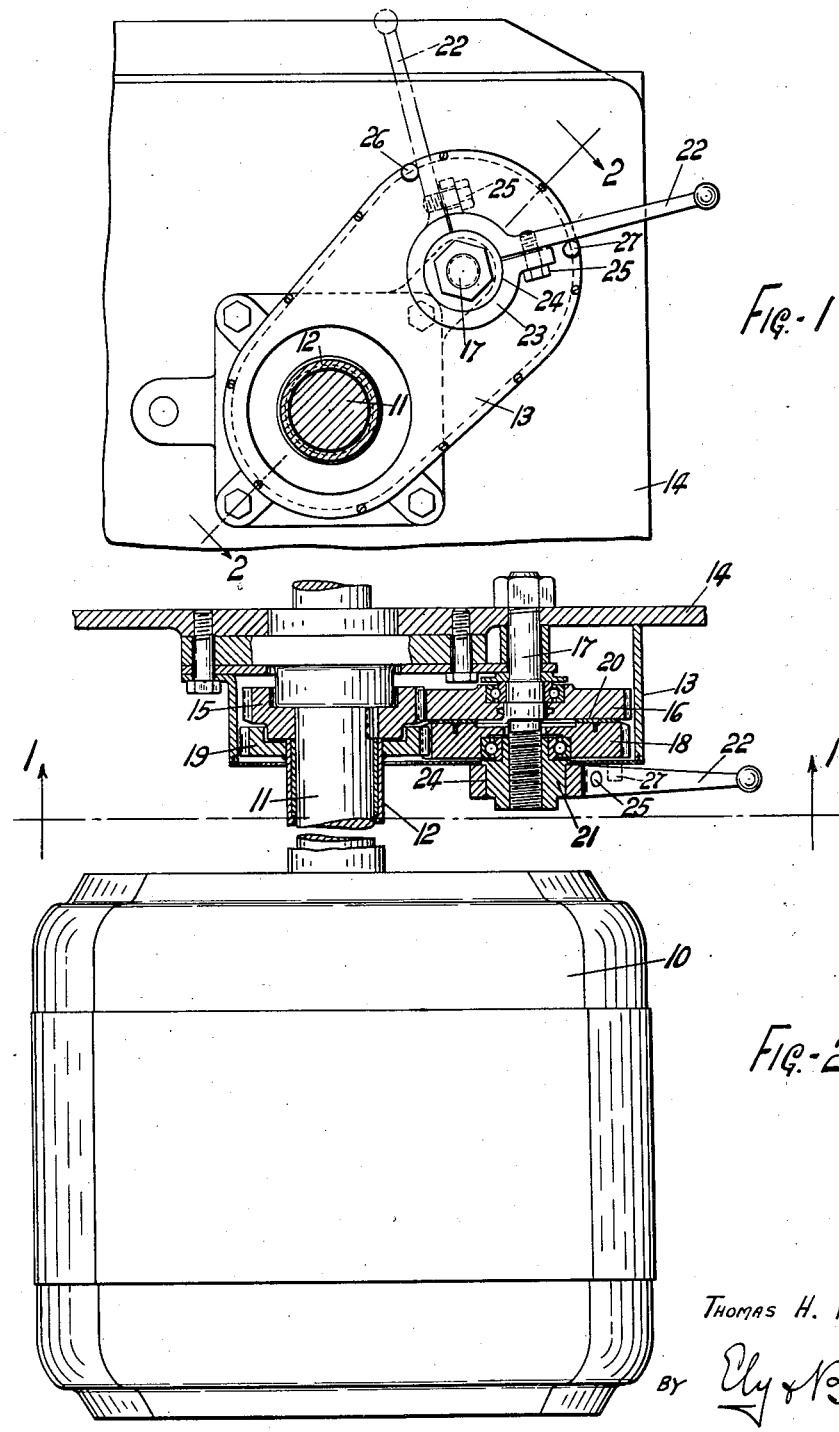

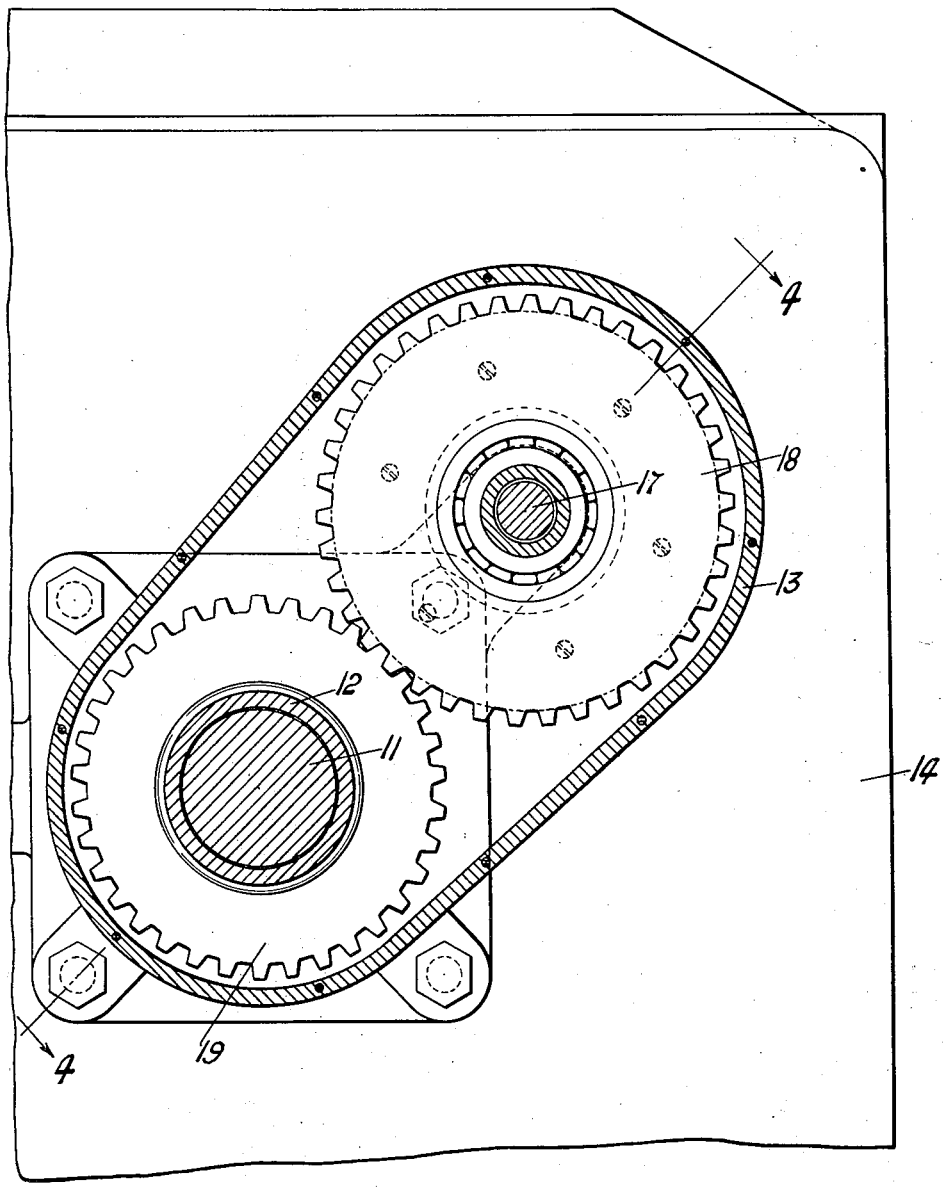

POWER OPERATED COLLAPSIBLE DRUM

Filed Aug. 22, 1932  4 Sheets—Sheet 4

INVENTOR
THOMAS H. WILLIAMS

BY

ATTORNEYS

Patented Jan. 8, 1935

1,987,566

UNITED STATES PATENT OFFICE 1,987,566

POWER-OPERATED COLLAPSIBLE DRUM

Thomas H. Williams, Akron, Ohio, assignor to National Rubber Machinery Company, Akron, Ohio, a corporation of Ohio Application August 22, 1932, Serial No. 629,843

10 Claims. (Cl. 154—9)

This invention relates to power-operated collapsible drums or forms such as are used in the manufacture of pneumatic tire casings.

Heretofore in the building of tires, drums or forms have been utilized comprising relatively rotatable parts, connections therefrom to the several sections of the drum for collapsing and expanding the drum, power means being connected to one of the relatively rotatable parts and brake means to the other relatively rotatable part for causing relative rotation of such parts.

There is considerable adhesion between a tire carcass and the form upon which it is built which requires substantial power to strip the drum sections inwardly away from the tire. It is customary practise with brake-operated drums to apply the brake several times, allowing the drum to obtain speed between applications of the brake in order to obtain sufficient momentum to collapse the drum. The action of the brake is sudden and produces considerable shock and jar in the drum structure. This is true also when the drum is expanded. For this reason drum maintenance is high and even breakage of the drum occurs from this cause.

The general purpose of the present invention is to provide a power actuated collapsible drum in which the relative rotation of the drum actuating parts is accomplished by power applied to both parts in such a way as to accomplish a positive controlled collapsing and expanding movement at a comparatively slow rate positively stripping the drum from the tire upon collapsing action and both expanding and collapsing the drum without substantial shock or jar.

A further purpose of the invention is to provide power means relatively rotating the drum parts in accordance with a substantially predetermined speed reduction, both parts rotating in the same direction but differentially.

A further purpose of the invention is to provide a friction clutch means for actuating the speed reduction means to produce the differential speeds of the drum parts and capable of slippage when the drum is fully expanded or fully collapsed.

The foregoing and other purposes of the invention are attained in the drum actuating mechanisms illustrated in the accompanying drawings and described below. It is to be understood that the invention is not limited to the forms thereof shown and described.

Of the accompanying drawings,

Figure 1 is an elevation partly in section on line 1—1 of Figure 2 of drum actuating mechanism embodying the invention;

Figure 2 is a plan of a drum showing the actuating mechanism partly in section on line 2—2 of Figure 1;

Figure 3 is an enlarged sectional view on line 3—3 of Figure 4 through the housing of the actuating mechanism shown in Figures 1 and 2;

Figure 4:
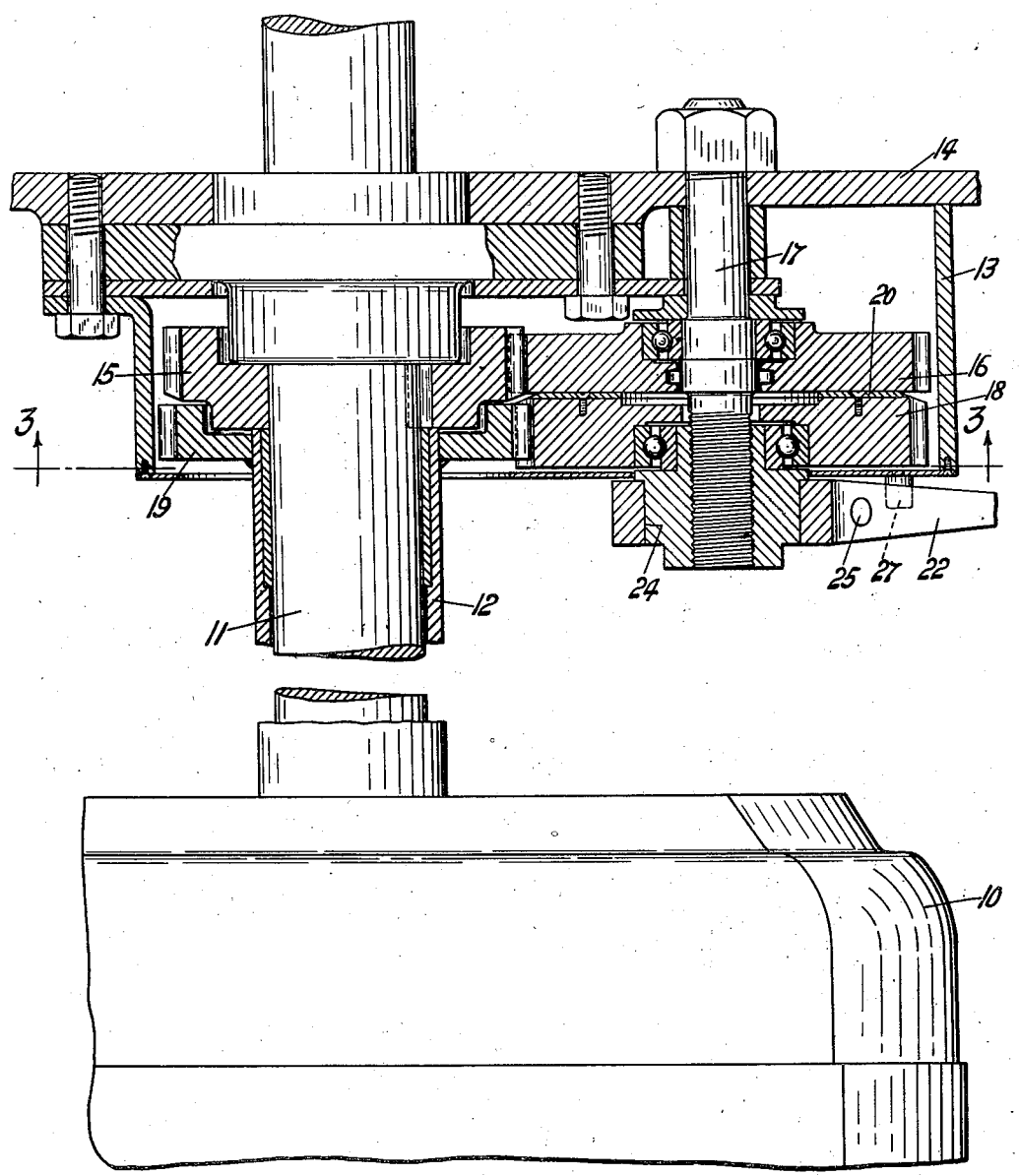
Figure 4 is an enlarged sectional view on line 4—4 of Figure 3.

Referring to the drawings, the numeral 10 designates a sectional tire building drum of a known type adapted to be collapsed or expanded by means (not shown) by relative rotation of the tire building machine shaft 11 and a sleeve or quill 12 surrounding said shaft.

Within a housing 13 which may be secured on the main frame or housing 14 of the tire building machine there is provided a gear 15 secured on shaft 11, a gear 16 rotatable but non-shiftable on a jack shaft 17 and meshed with gear 15, a gear 18 axially shiftable and also rotatable on shaft 17, and a gear 19 secured to sleeve or quill 12 and meshed with gear 18. Gears 16 and 18 are arranged normally to idle on shaft 17 but gear 18 may be shifted into frictionally clutched relation with gear 16 to rotate therewith, a friction clutch facing 20 preferably being provided on gear 18 to engage gear 16. The gearing, as shown, is so designed as to produce a differential rotation between shaft 11 and quill 12 when gears 16 and 18 are clutched together.

For shifting gear 18 a nut 21 may be threaded onto shaft 17, gear 18 being journaled on the nut 21. An actuating handle 22 is connected to the nut by a split clamping sleeve 23 adjustably secured on a cylindrical formation 24 on the nut by means of a bolt 25. Stops 26 and 27 may be provided for limiting movement of handle 22 in either direction.

In operation of the device shown in Figures 1 to 4 of the drawings, it will be understood that when it is desired to collapse the drum, the shaft 11 will be rotated in one direction and the handle 22 (which normally is in the dotted line position of Figure 1) will be swung to the full-line position shown in Figure 1 clutching gear 18 to gear 16. The quill 12, instead of rotating with the shaft (as normally occurs) will rotate in the same direction but at somewhat less speed depending upon the gear reduction. This relative movement of the shaft and quill will cause gradual collapse of the drum which will be completed after a certain number of revolutions of the shaft. The collapsing may be accomplished by speeding up the drum by power, then releasing the power and actuating the handle 22 as described whereby the relative rotation of the shaft and quill is produced by the momentum of rotation of the drum, the friction of the collapsing operation slowing up the drum as it is collapsed and slippage occurring between gears 16 and 18 after the complete collapse of the drum. The collapsing may also be accomplished by rotating the drum slowly with either continuous or intermittent power application. Either of these modes of operation are preferred since centrifugal force of the revolving drum tends to resist collapsing thereof.

Due to the controlled gradual collapse of the drum by the speed reduction actuating device the collapsing force applied to the drum need not be great and yet the drum will be effectively stripped from the tire and collapsed upon a single operation of the actuating device and without substantial shock or jar.

To expand the drum, it is driven in the reverse direction while the lever 22 is in the full line position shown. After it has been fully expanded the lever 22 is returned to its normal dotted line position. Expanding of the drum as will be understood will be accomplished gradually at a controlled rate and without shock or jar, the gears 16 and 18 slipping relative to each other after the drum is fully expanded until the gears are disengaged by operation of the hand lever.

Figure 6:
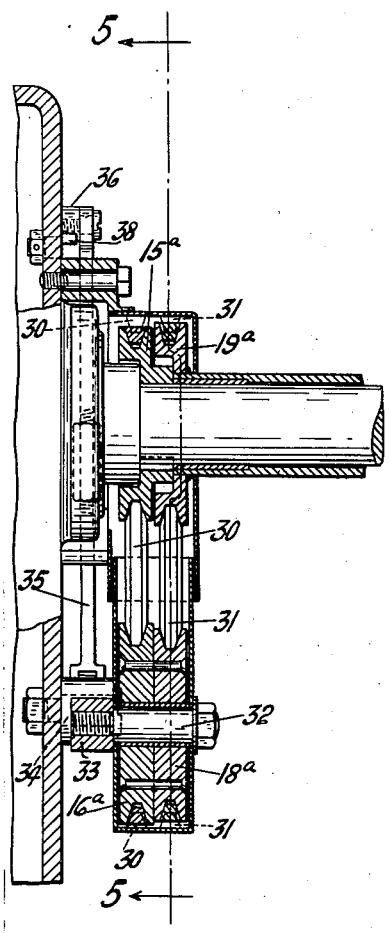
Figure 6 is a section on line 6—6 of Figure 5.
Figure 5:
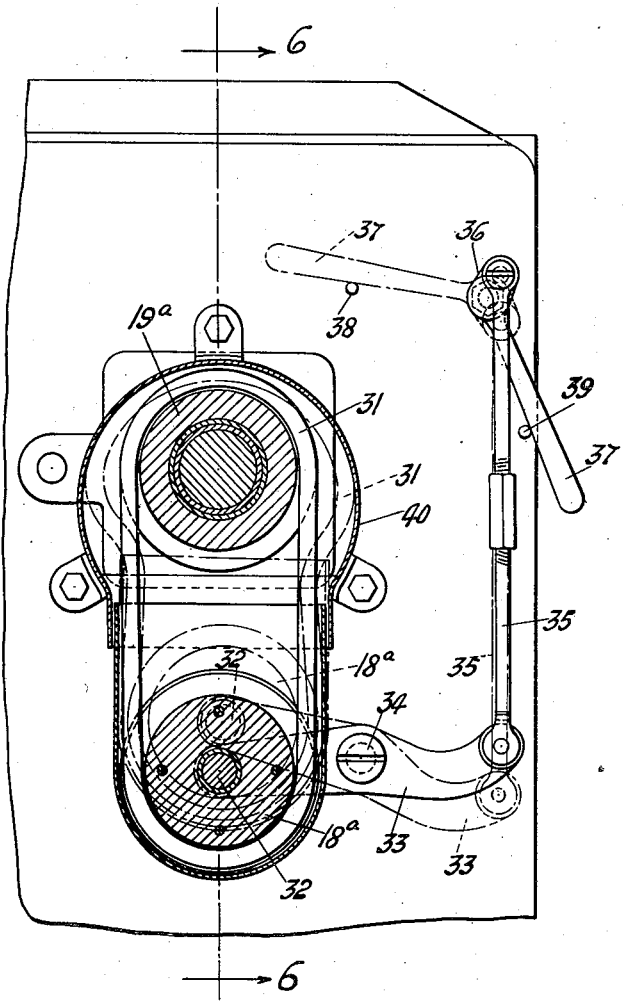
Figure 5 is a section on line 5—5 of Figure 6 showing a modified form of the invention.

In the form of invention illustrated in Figures 5 and 6, instead of using gears, pulleys 15ª, 16ª, 18ª and 19ª corresponding, respectively to gears 15, 16, 18 and 19 are employed. Over these pulleys there are trained driving belts 30 and 31. Such an arrangement may be made using the nut 21 and lever 22 to shift pulley 18ª into engagement with pulley 16ª. However, since the belts 30 and 31 may slip gears 18ª and 16ª may be secured together as shown and the device may be actuated by tightening or loosening the belts on the pulleys.

To this end the pulleys 15ª, 16ª, 18ª and 19ª may be of the V-groove type and the belts 30 and 31 may be V-belts engaging in said grooves. Pulleys 18ª and 16ª may be mounted on a shaft 32 arranged to be raised and lowered by a lever 33 connected to the shaft, such lever being pivoted as at 34 and being operable through a link 35 and a toggle 36 by a hand lever 37 arranged to be swung between limits 38 and 39 at which the toggle locks the pulleys 18ª and 16ª either in lowered or raised positions. The V-belts 30 and 31 employed will be of the type formed of resilient material such as rubber and fabric initially formed in circular shape and tending to return to such shape when tension thereon is relieved. The housing about the pulleys 15ª and 19ª accordingly will be enlarged as indicated at 40 permitting the belts to expand when pulleys 18ª and 16ª are raised as indicated in dotted lines in Figures 5 and 6 so as to free the belts from pulleys 15ª and 19ª. The enlarged portion 40 of the housing, however, so embraces the pulleys 15ª and 19ª at the tops thereof as to prevent expansion of the belts entirely out of the grooves of these pulleys (see especially Figure 6). This maintains the belts so aligned as to reengage with the pulleys 15ª and 19ª upon lowering of pulleys 18ª and 16ª to tension the belts.

In operation of the device shown in Figures 5 and 6, the drum will be driven or will be allowed to rotate under its own momentum in one direction and the belts 30 and 31 tightened by lowering pulleys 18ª and 16ª to the full line positions shown, the belt slipping on the pulley after the drum has completely collapsed. To expand the drum it is rotated in the other direction while the belts are tightened on the pulleys, slippage of the belts occurring after complete expansion until they are released from pulleys 15ª and 19ª by actuation of handle 37 to raise the pulleys 18ª and 16ª.

The modes of operation of both devices excepting for the differences noted in the preceding paragraph are otherwise the same, a gradual controlled collapsing or expanding actuation of the drum being secured by a single operation of the control lever in either case and without substantial shock or jar.

Modifications of the invention other than those disclosed herein obviously may be resorted to without departing from the spirit thereof or the scope of the appended claims. Many different forms of speed reductions, either gear, chain and sprocket, belt and pulley, etc. may be used.

What is claimed is:

1. The combination with a rotary sectional tire building form comprising bag sections collapsible to prevent removal of a tire therefrom and including relatively rotatable members for collapsing the form sections and adapted to rotate in unison, of speed reduction means between said relatively rotatable members adapted upon rotation of one member to rotate the other at a differential rate, said speed reduction means including elements relatively movable to and from frictional engagement with each other and adapted when engaged to produce such differential rotation and when disengaged to allow said speed reduction means to idle so as not to affect rotation of said relatively rotatable members in unison, and means operable at will for engaging and disengaging said relatively movable elements fully to collapse or expand said form.

2. The combination with a rotary collapsible form including relatively rotatable members for collapsing the form and adapted to rotate in unison, of speed reduction means between said relatively rotatable members adapted upon rotation of one member to rotate the other at a differential rate, said speed reduction means including elements relatively movable to and from frictional engagement with each other and adapted when engaged to produce such differential rotation and when disengaged to allow said speed reduction means to idle so as not to affect rotation of said relatively rotatable members in unison, and means operable at will for engaging and disengaging said relatively movable elements, said speed reduction means comprising a gear secured to one member, a second gear secured to the other member, a gear comprising one of said relatively movable elements meshed with the first named gear and a gear comprising the other of said relatively movable elements meshed with the second-named gear.

3. The combination with a rotatable sectional tire building form, the sections of which are collapsible to permit removal of a tire therefrom and including members rotatable differentially or in unison and adapted when rotated differentially to collapse or expand the form, of speed reduction mechanism between said relatively rotatable members for producing differential rotation thereof, said speed reduction mechanism including relatively shiftable elements adapted to be relatively shifted at will to produce such differential rotation so as fully to collapse or expand the form.

4. The combination with a rotatable tire building form comprising a plurality of sections collapsible to permit removal of a tire therefrom and including members rotatable differentially or in unison and adapted when rotated differentially to collapse or expand the form, of a speed reduction mechanism between said relative rotatable members for producing differential rotation thereof, said speed reduction mechanism including relatively shiftable elements adapted to be relatively shifted at will to produce such differential rotation so as fully to collapse or expand the form, said elements being adapted to slip relative to each other upon complete collapse or complete expansion of the form.

5. The combination with a rotatable tire building form comprising sections collapsible to permit removal of a tire therefrom and including members rotatable differentially or in unison and adapted when rotated differentially to collapse or expand the form, of a speed reduction mechanism between said relative rotatable members for producing differential rotation thereof, and means for operating said mechanism at will so as fully to collapse or expand the form.

6. The combination with a rotatable tire building form comprising a plurality of sections collapsible to permit removal of a tire therefrom and including relative rotatable members for collapsing and expanding the form and adapted to rotate in unison, of a speed reduction mechanism for relatively rotating said members at a determinate controlled rate, said mechanism including relatively shiftable elements adapted to be engaged or disengaged at will so as fully to expand or collapse said form and when disengaged to allow said speed reduction means to idle.

7. The combination with a rotatable tire building form comprising a plurality of sections collapsible to permit removal of a tire therefrom and including relatively rotatable members for collapsing and expanding the form and adapted to rotate in unison, of a speed reduction mechanism for relatively rotating said members at a determinate controlled rate, said mechanism including relatively shiftable elements adapted to be engaged or disengaged at will fully to expand or collapse the form and when disengaged to allow said speed reduction means to idle, said elements being adapted for frictional engagement with each other whereby they may slip relative to each other when the form is fully expanded or fully collapsed.

8. The combination with a rotary tire building form comprising a plurality of sections collapsible to permit removal of a tire therefrom and including members rotatable in unison or relatively to each other and adapted upon relative rotation fully to collapse or expand the form, of driving connections between the members adapted to be engaged or disengaged at will for relatively rotating said members upon rotation of one of said members.

9. The combination with a rotary tire building form comprising a plurality of sections collapsible to permit removal of a tire therefrom and including members rotatable in unison or relatively to each other and adapted upon relative rotation to collapse or expand the form, of driving connections between the members adapted to be engaged or disengaged at will for relatively rotating said members upon rotation of one of said members, said connections including relatively movable friction elements adapted to slip on each other when the form is fully expanded or collapsed.

10. The combination with a collapsible tire building form including a plurality of sections collapsible to permit removal of a tire therefrom, of means for collapsing or expanding the form including members rotatable in unison or differentially and means for differentially rotating said members at a predetermined rate, said means including relatively movable elements adapted to be frictionally engaged at will fully to collapse or expand the form.

THOMAS H. WILLIAMS.